United States Patent [19]

Evans

[11] Patent Number: 5,038,895

[45] Date of Patent: Aug. 13, 1991

[54] AUTOMATIC ADJUSTING MECHANISM FOR A DISC BRAKE ASSEMBLY HAVING A MECHANICALLY ACTUATED PARKING BRAKE

[75] Inventor: Anthony C. Evans, Northville, Mich.

[73] Assignee: Kelsey-Hayes Company, Romulus, Mich.

[21] Appl. No.: 438,957

[22] Filed: Nov. 13, 1989

Related U.S. Application Data

[63] Continuation of Ser. No. 261,196, Oct. 24, 1988, abandoned.

[51] Int. Cl.$^5$ .................................. F16D 55/18
[52] U.S. Cl. .......................... 188/72.7; 188/72.9; 188/106 F; 188/196 D
[58] Field of Search .............. 188/72.4, 72.6, 72.7, 188/71.9, 196 D, 196 V, 106 F, 203, 370, 343; 192/111 A, 70.23; 384/614

[56] References Cited

U.S. PATENT DOCUMENTS

| | | | |
|---|---|---|---|
| 3,610,373 | 10/1971 | Burnett | 188/71.9 |
| 3,688,875 | 9/1972 | De Hoff et al. | 188/72.6 X |
| 3,767,016 | 10/1973 | Hurt | 188/196 D X |
| 3,833,095 | 9/1974 | Engle | 188/196 D X |
| 3,835,961 | 9/1974 | Troester et al. | 188/106 F X |
| 3,920,103 | 11/1975 | Hariakawa | 188/196 D X |
| 4,454,933 | 6/1984 | Hunnicutt et al. | 188/196 D X |
| 4,544,045 | 10/1985 | Runkle | 188/72.6 |
| 4,691,809 | 9/1987 | Le Marchand et al. | 188/196 D X |
| 4,702,354 | 10/1987 | Ingram et al. | 188/196 D |

FOREIGN PATENT DOCUMENTS

| | | |
|---|---|---|
| 103512 | 3/1984 | European Pat. Off. |
| 2646631 | 4/1977 | Fed. Rep. of Germany |
| 1276071 | 6/1972 | United Kingdom |
| 1343545 | 1/1974 | United Kingdom |
| 2153934 | 8/1985 | United Kingdom |
| 2155126 | 9/1985 | United Kingdom |

Primary Examiner—Robert J. Oberleitner
Assistant Examiner—Alfred Muratori
Attorney, Agent, or Firm—MacMillan, Sobanski & Todd

[57] ABSTRACT

A disc brake mechanism, including an integral mechanical parking brake assembly and having automatic wear adjustment features, is disclosed. The adjusting mechanism comprises an axial thrust screw having one end exposed to atmospheric pressure to create an axial hydraulic differential pressure acting thereacross. An adjusting nut is threadably received on the thrust screw and normally engages a hydraulic actuating piston such that the adjusting nut is free to rotate with respect to the thrust screw and piston. Hydraulic pressures acting upon the thrust screw create opposing forces, the resultant of which is applied to a resisting mechanical spring. So long as the hydraulic pressure is below a predetermined value, the resultant hydraulic force acting upon the thrust screw is insufficient to overcome the resisting spring force and the thrust screw remains stationary. As the hydraulic piston moves upon hydraulic actuation of the brake, the adjusting nut is biased to rotatingly advance relative to the thrust screw, thereby adjusting for friction pad wear. As hydraulic pressure increase above the predetermined value, the resultant hydraulic force acting upon the thrust screw is sufficient to overcome the resisting mechanical spring, and the thrust screw in combination with the adjusting nut translates toward the piston. This causes the adjusting nut to frictionally engage the piston preventing any further advance of the adjusting nut relative to the thrust screw, thereby ending the adjustment cycle.

10 Claims, 5 Drawing Sheets

AUTOMATIC ADJUSTING MECHANISM FOR A DISC BRAKE ASSEMBLY HAVING A MECHANICALLY ACTUATED PARKING BRAKE

This application is a continuation of application Ser. No. 07/261196 filed Oct. 24, 1988, now abandoned.

BACKGROUND OF THE INVENTION

My invention relates to disc brakes and disc brake systems. Historically, in the United States, the use of disc brakes has primarily been limited to front wheel applications with the typical drum brake system used on rear wheel installations. However, an interest in rear wheel disc brakes is developing.

Use of rear wheel disc brakes requires an adequate and dependable mechanical parking brake system preferably integral to the disc brake. Such an integral system preferably includes an adjustment mechanism whereby the friction pad to rotor clearance is maintained and automatically adjusted for friction pad wear.

SUMMARY OF THE INVENTION

According to the present invention, a mechanical parking brake assembly, integral to the disc brake mechanism and having automatic wear adjustment features, is disclosed.

The novel adjusting mechanism comprises an axial thrust screw having an axial differential pressure acting thereacross. An adjusting nut is threadingly received on the thrust screw and rotatingly attached to the hydraulic actuating piston such that the adjusting nut is free to rotate with respect to the thrust screw and piston.

The hydraulic pressure acting upon the thrust screw creates opposing forces, the resultant of which is applied to a resisting mechanical spring. So long as the hydraulic pressure is less than a predetermined value, approximately 200 psi for a typical automobile brake system, the resultant hydraulic force acting upon the thrust screw is insufficient to overcome the given resisting spring force and the thrust screw remains stationary. As the hydraulic piston moves upon hydraulic actuation of the brake the adjusting nut is dragged along and rotatingly advances relative to the thrust screw thereby adjusting for friction pad wear. As resistance between the disc and friction pads increase a proportional increase in hydraulic pressure occurs. When the resultant hydraulic force acting upon the thrust screw is sufficient to overcome the resisting mechanical spring, the thrust screw in combination with the adjusting nut translates toward the piston causing the adjusting nut to frictionally engage the piston preventing any further advance of the adjusting nut relative to the thrust screw thereby ending the adjustment cycle.

Although the adjusting mechanism is taught in combination with a mechanical parking brake it may also be adapted to any hydraulic disc brake mechanism.

DETAILED DESCRIPTION OF THE PREFERRED EMBODIMENT

ASSEMBLY

Figure 1:
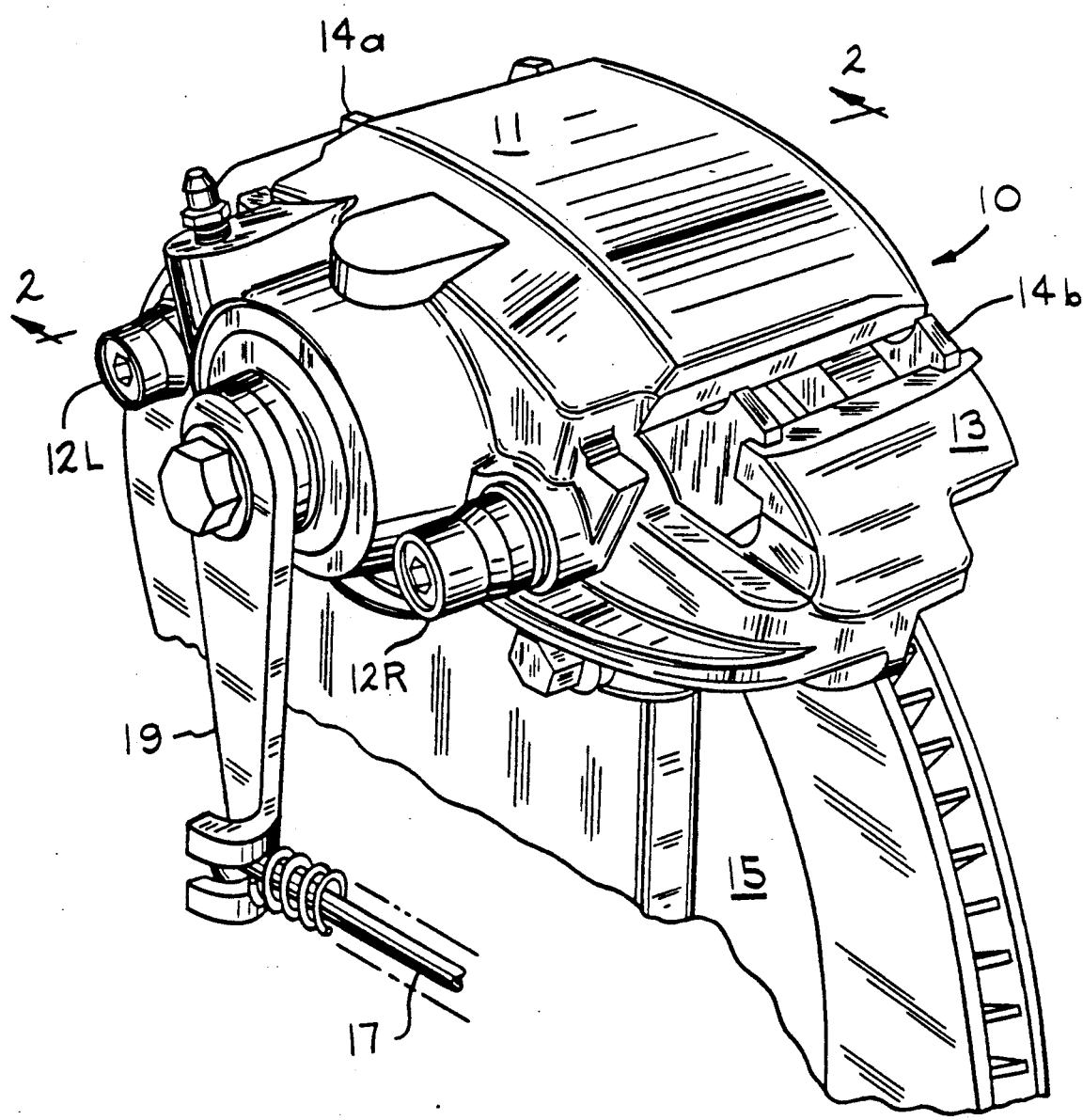
FIG. 1 represents a pictorial view of a disc brake assembly embodying my invention.

FIG. 1 shows a typical floating caliper disc brake assembly 10. Caliper 11 is slidably supported upon caliper guide pin assemblies 12L and 12R. Pins 12L and 12R are affixed to anchor plate 13 which in turn supports the inboard and outboard friction pad assemblies 14a and 14b such that the braking torque is transmitted directly to anchor plate 13.

Figure 2:
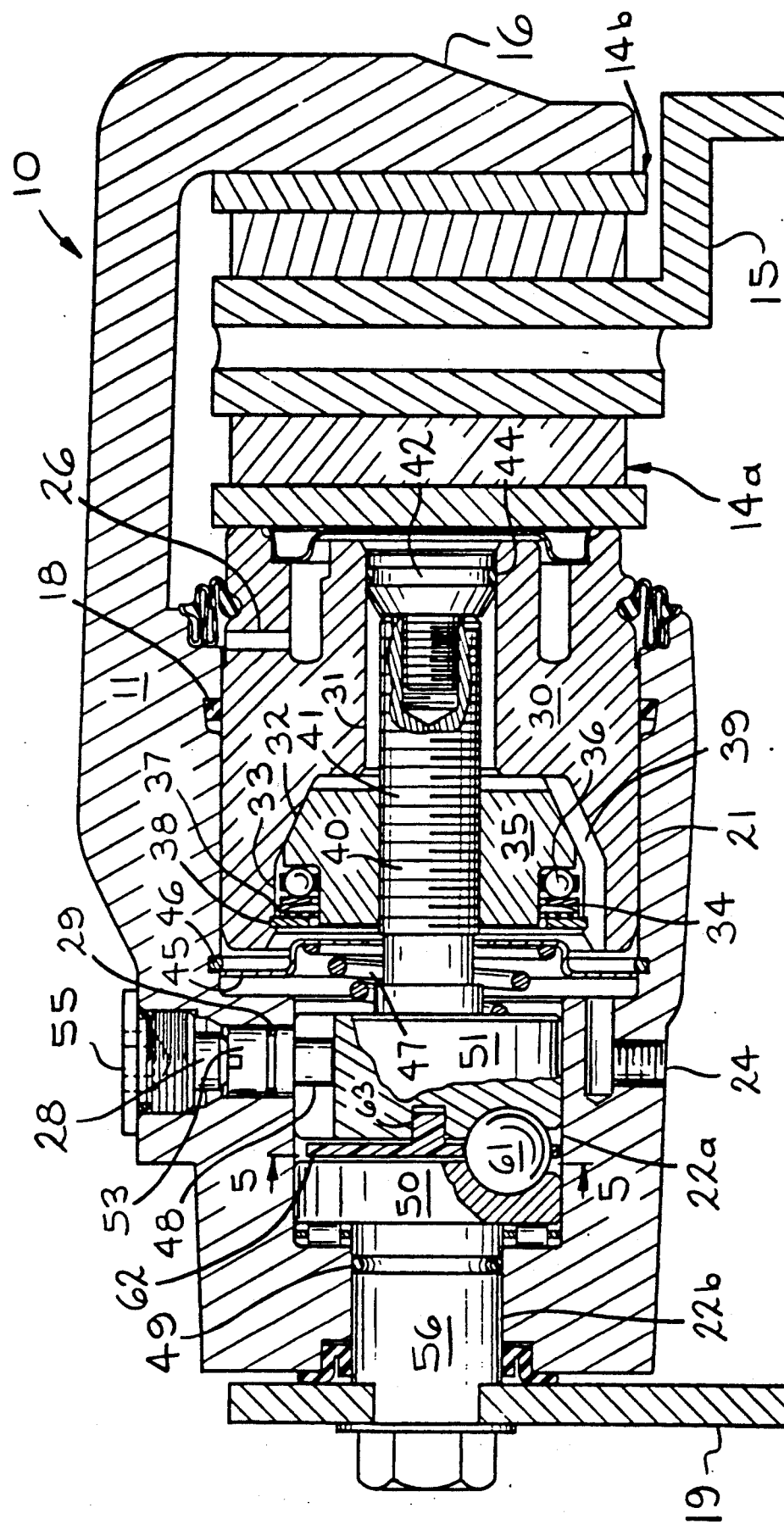
FIG. 2 is a cross-sectional view taken along line 2—2 in FIG. 1 and showing the elements of my preferred embodiment.
Figure 3:
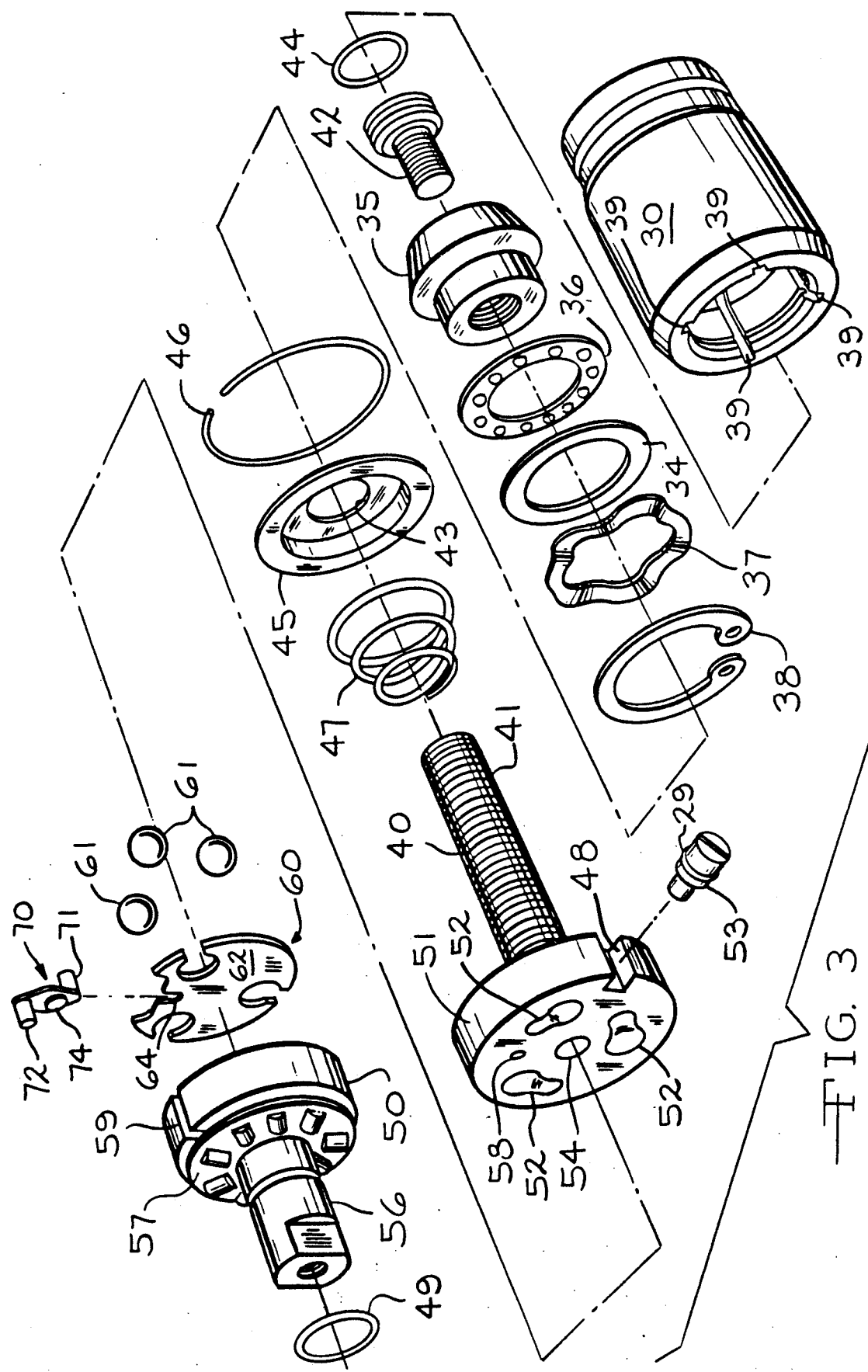
FIG. 3 is an exploded pictorial view of the adjuster elements shown in FIG. 2.
Figure 4:
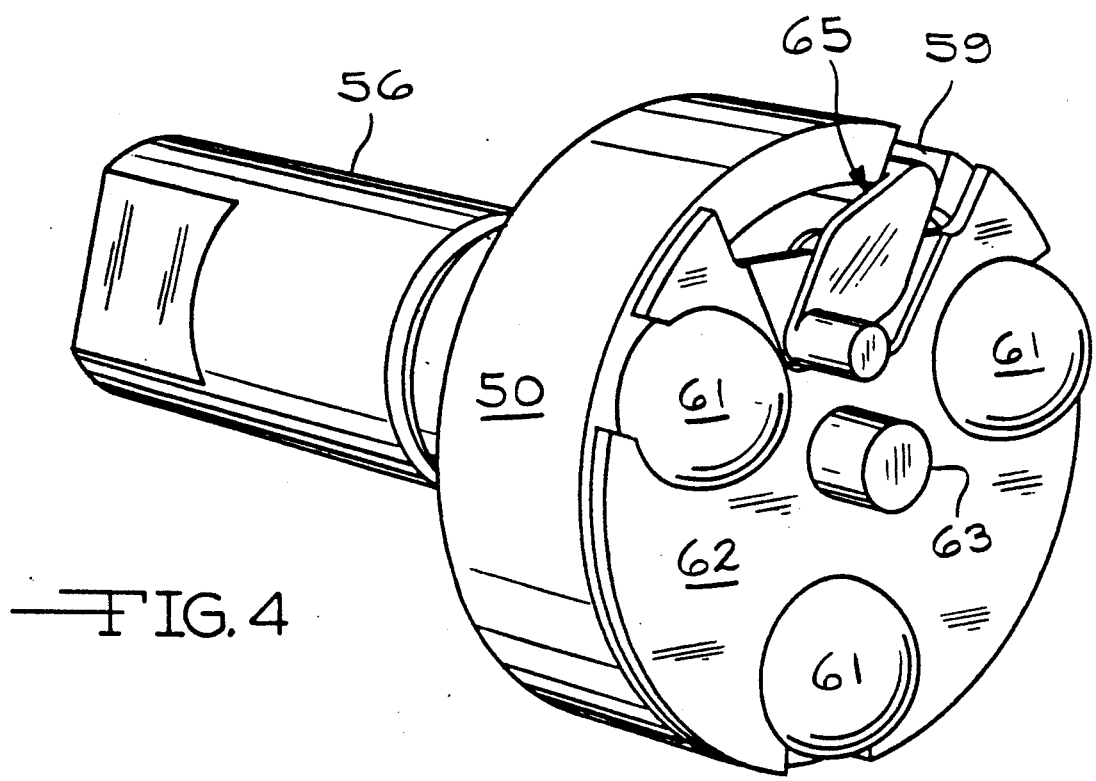
FIG. 4 is an isolated pictorial showing the rotor cam plate and the ball bearing race assembly.
Figure 5:
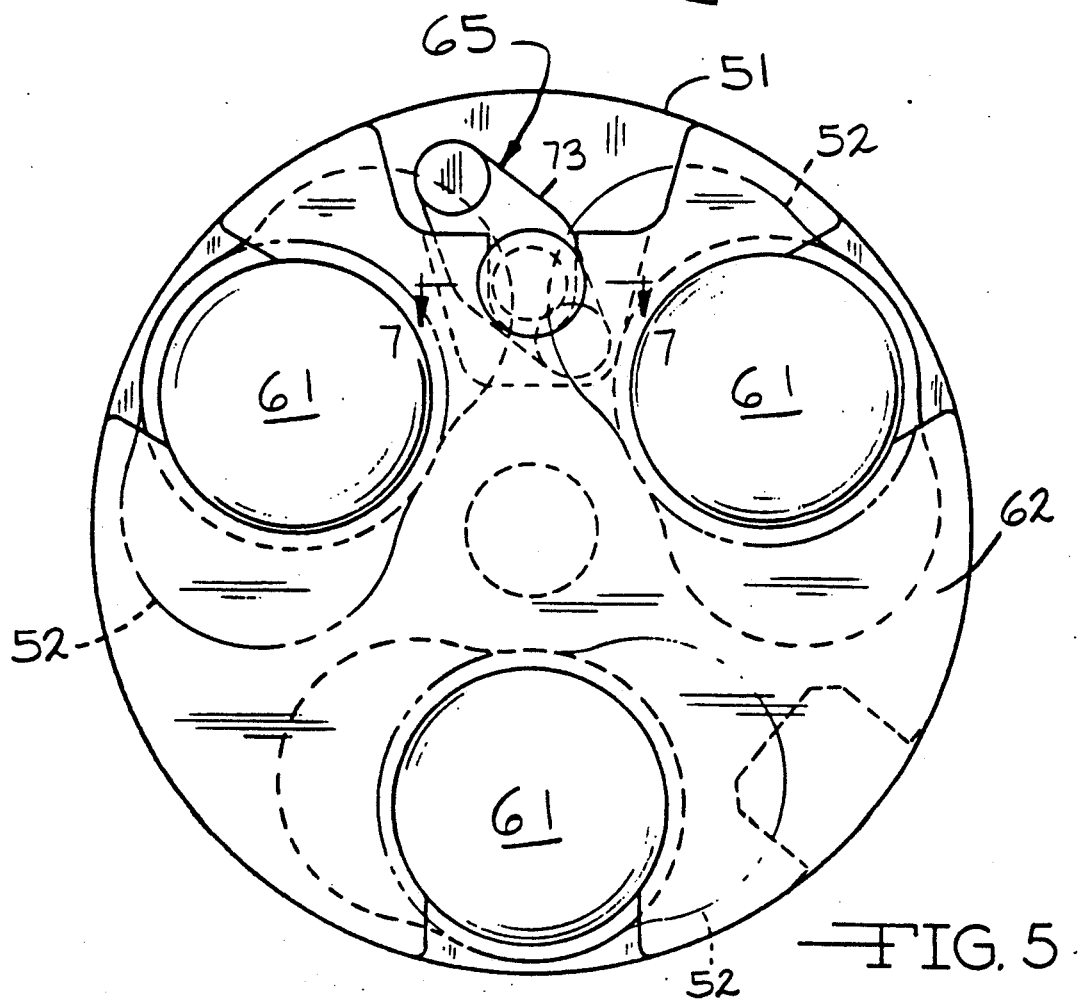
FIG. 5 is a sectional view taken along line 5—5 in FIG. 2.

FIGS. 2 and 3 show a cross-section and an exploded view of my improved combined mechanical parking brake and friction pad wear adjuster mechanism. Caliper 11 includes a piston cylinder bore 21, a two stepped cam actuator bore 22a and 22b. Positioned within hydraulic piston bore 21 is hydraulic piston 30 forming a hydraulic seal with piston bore 21 by means of piston seal 18. Piston 30 includes a three-stepped internal bore comprising an end bore 31, an adjustment nut bore 32 and an assembly access bore 33. Assembled within piston 30 is adjusting nut 35, ball bearing assembly 36, flat washer 34, wavy washer 37 and lock ring 38.

Adjusting nut 35 and bore 32 are shown as having matching conical surfaces, however, any other set of mating surfaces may be used as will become more apparent upon understanding the functional relationship between these surfaces as described below. It may be desirable, under certain operating conditions to provide matching serrations or other frictionally engaging means on these mating surfaces.

Thrust screw 40 axially extends from cam plate 51 threadingly engaging adjusting nut 35. Thrust screw threads 41 and the matching threads of adjusting nut 35 are of such pitch that nut 35 will rotatly translate along screw 40 in response to a given axial force applied to nut 35. For example a three start buttress thread having 10 threads per inch has been found to be satisfactory. However, any suitable multi start high helix thread may be used. Antirotation stud 53 engages slot 48 in cam plate 51 thereby restraining rotation of cam plate 51 and thrust screw 40. Antirotation stud 53 is hydraulically sealed by O-ring 29 and held in place by threaded plug 55 and spacer 28. Threaded into thrust screw 40, axially opposite cam plate 51, is end plug 42 forming a hydraulic seal with end bore 31 by means of O-ring 44 such that hydraulic actuating pressure acts upon the inboard surface area of plug 42 and atmospheric pressure acts upon the outboard surface area by way of atmospheric vent 26.

In the non applied brake mode (at rest position) wavy washer 37 exerts a sufficient outboard axial force upon adjusting nut 35, acting through ball bearing assembly 36, to force adjusting nut 35 into frictional engagement with piston 30 as shown in FIG. 2.

Positioned between piston bore 21 and actuating bore 22a is spring abutment plate 45 having a central aperture 43 through which thrust screw 40 extends and permits hydraulic fluid passage between bores 21 and 22a. Abutment plate 45 is held in position by snap ring 46 and the compression of conical spring 47 between cam plate 51 and spring plate 45.

Within the cam actuator bore 22a is a rotary ball cam actuating mechanism comprising stationary cam plate 51, rotary cam plate 50, ball bearing race assembly 60, and thrust bearing 57. Rotary cam shaft 56 extends through and forms a hydraulic seal with bore 22b by means of O-ring 49 and engages the parking brake actuation lever 19.

Figure 6:
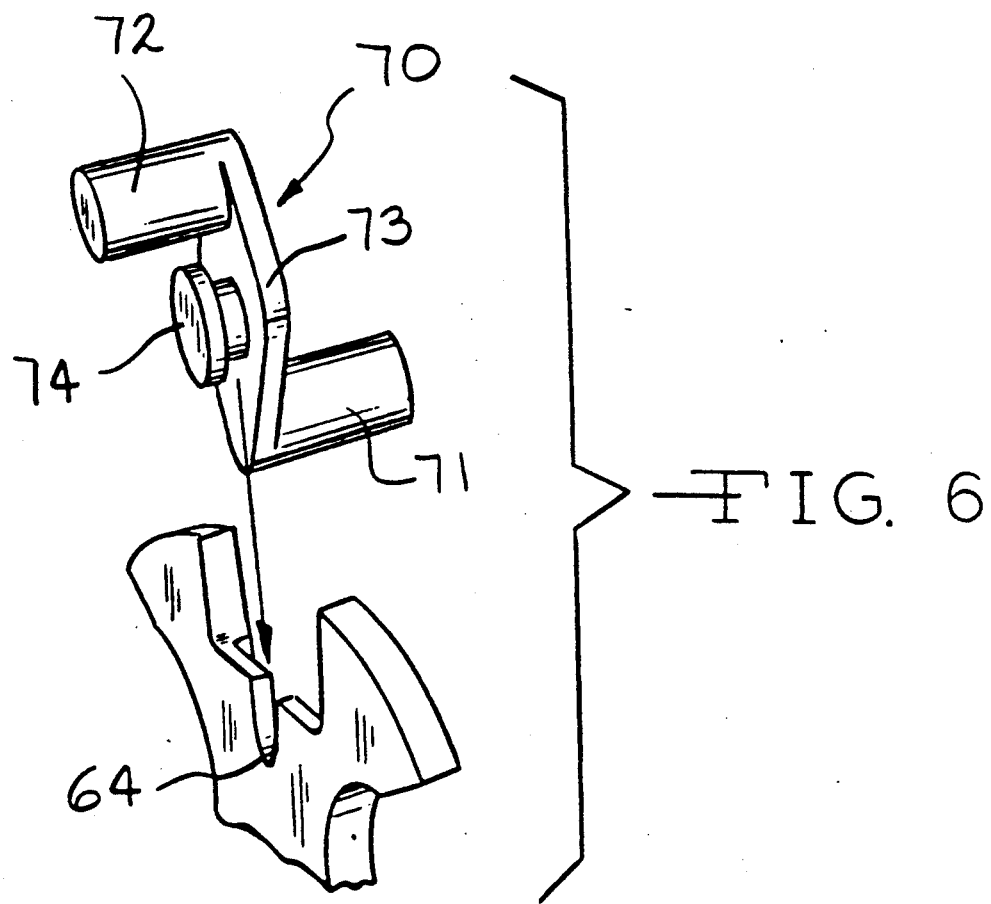
FIG. 6 is an isolated pictorial showing construction details of the eccentric pin lever.
Figure 7:
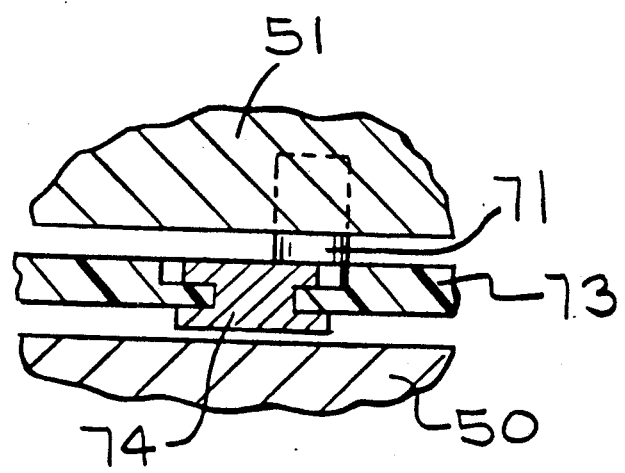
FIG. 7 is a cross sectional view taken along line 7—7 of FIG. 5.

Ball bearing race assembly 60 comprises race 62, balls 61, and eccentric pin lever 70. Eccentric pin lever 70 comprises oppositely extending pins 71 and 72 affixed to and at opposite ends of swivel plate 73. As best seen in FIGS. 6 and 7 pivot pin 74 is rotatingly received in notch 64 of race 62 such that pin 71 extends axially outboard of race 62 and pin 72 extends axially inboard of race 62. Ball bearing race assembly 60 is positioned between stationary cam plate 51 and rotary cam plate 50 such that race pivot 63 is received within pivot hole 54 of cam plate 51 and pins 71 and 72 of the eccentric pin lever 70 engage pin hole 58 in stationary cam plate 51 and slot 59 in rotary cam plate 50 respectively thereby positioning balls 61 adjacent their respective cam plate surfaces 52. Cam plate 51 and 50 are both provided corresponding cam plate surfaces 52.

MECHANICAL OPERATION

To operate the mechanical parking brake feature, the mechanical actuating lever 19 is caused to rotate by action of brake cable 17. Thus rotatable cam plate 50 rotates affecting axial translation of stationary cam plate 51 resulting in an axial force being applied to thrust screw 40. When the axial force is sufficient to compress the conical spring 47 thrust screw 40 axially translates toward rotor 15 thereby forcing adjusting nut 35 into abutting engagement with hydraulic piston 30 urging piston 30 into abutting contact with the inboard friction pad assembly 14a; the reaction force acting upon claiper 11 causes the caliper to translate inboard thereby urging the caliper outboard leg 16 into abutting contact with outboard friction pad assembly 14b. Thus both inboard and outboard friction pad assemblies 14a and 14b are caused to frictionally engage rotor 15.

Upon release of the mechanical parking brake, mechanical actuating lever 19 is caused to return to its non applied position, thereby permitting the energy stored within the conical spring 47, by compression thereof during mechanical brake application, to affect retraction of thrust screw 40, adjusting nut 35, piston 30, and friction pad assembly 14a.

As rotatable cam 50 rotates relative to stationary cam 51 race 62 tracks with balls 61 by the pivotal action of swivel plate 73 about pivot pin 74. Although the eccentric pin lever 70 serves no necessary purpose during mechanical operation of the brake its utility will be appreciated during hydraulic operation of the brake as described below.

HYDRAULIC OPERATION

Hydraulic fluid and hydraulic actuating pressure is supplied by the vehicle master cylinder (not shown) to inlet port 24 thereby hydraulically pressurizing the combined volume of piston bore 21 and mechanical actuator bore 22a and 22b. End bore 31 is also pressurized by the flow of hydraulic fluid past adjusting nut 35 through axial passageways 39 in piston 30. When hydraulically actuated, piston 30 is urged toward rotor 15 so as to affect frictional engagement between friction pad assemblies 14a and 14b and rotor 15. As piston 30 translates toward rotor 15, beyond the running clearance between adjusting nut 35 and thrust screw threads 41, separation occurs between the conical portion of adjusting nut 35 and bore 32 by compression of wavy washer 37. When sufficient separation occurs eliminating the frictional engagement between the adjusting nut 35 and bore 32, a condition which results from frictional wear of the friction pad assembly 14a, the energy stored in wavy washer 37, by compression thereof, will apply an outboard axial force upon adjusting nut 35, acting through ball bearing assembly 36, causing rotational outboard translation of adjusting nut 35 along thrust screw 40 until adjusting nut 35 is restored to frictional engagement with bore 32 thereby adjusting the axial position of hydarulic piston 30, with respect to the thrust screw 40, for wear of friction pad assemblies 14a and 14b.

During the commencement of hydraulic brake actuation, cam plate 51 and thrust screw 40 are fixed in place as shown in FIG. 2 by the action of conical spring 47 overcoming the differential hydraulic pressure acting upon cam plate 51. However, as the hydraulic actuating pressure continues to increase (generally beyond 200 psi) the resulting outboard axial force acting upon the cross sectional area of end plug 42 will overcome the force of conical spring 47 thus causing cam plate 51, thrust screw 40 and the adjusting nut to translate axially outboard thereby forcing adjusting nut 35 into firm frictional contact with bore 32 in piston 30 preventing rotational outboard translation of adjusting nut 35 relative to thrust screw 40 thereby preventing over adjustment of piston 30 due to caliper deflection and compression of the frictional material of friction pad assemblies 14a and 14b.

It will be recognized that under hydraulic actuation of the brake as described immediately above, cam plate 51 will axially translate outboard and separate from cam plate 50. Under this condition the eccentric pin lever 70 acts to maintain the orientation of ball bearing race assembly 60 with respect to cam plate 50 and cam plate 51. When cam plate 50 and 51 are separated and cam plate 50 is rotated relative to cam plate 51 the rotational action of eccentric pin lever 70 about pivot 74 causes circumferential translation of pivot 74 thereby rotating ball bearing race assembly 60 proportional to the angular rotation of cam plate 50 so as to maintain the angular displacement of balls 61 with respect to cam plate surfaces 52.

BRAKE SERVICING

Upon servicing of the brake it may be necessary to push the actuation piston 30 back into bore 21 to sufficiently separate friction pad assembly 14a from rotor 15 for removal of caliper 11. This is accomplished by disengagement of antirotation stud 53 from cam plate 51 and rotating the mechanical actuation lever 19 clockwise thereby retracting adjusting nut 35 thus permitting push back of piston 30. Antirotation stud 53 is disengaged from cam plate 51 by removing threaded plug 55 and spacer 28 followed by replacement of plug 55 and hydraulic actuation of the brake; the hydraulic pressure within bore 22a will then disengage stud 53 from cam plate 51 without opening the hydraulic system to the atmosphere.

It is to be understood that the foregoing embodiments are those preferred by the inventor. Various changes and modifications may be made without departing from the spirit and scope of the invention as defined in the appended claims.

I claim:

1. In a mechanically actuated brake assembly having a rotary ball cam actuating mechanism including a first cam plate and an opposing second cam plate, each cam plate having a multiplicity of oppositely corresponding ball ramp surfaces, a corresponding number of balls positioned between and received within said ball ramp surfaces whereby rotation of said first cam plate causes said balls to roll along said ball ramp surfaces thereby effecting axial separtion of said cam plates by an amount proportional to the angular rotation of said first cam plate, the improvement comprising race means positioned between said first and second cam plates affixing the annular orientation of said balls one to the other, said race means including crank means communicating with said first and second cam plates whereby rotation of said first cam plate relative to said second cam plate causes said crank means to correspondingly position said race means such that said balls track along said ball ramps on a predetermined path.

2. An automatic adjusting mechanism for a caliper disc brake assembly having first and second caliper legs, said first leg defining a cylinder, a hydraulically activated piston slidably and sealingly received within said cylinder, means for hydraulically pressurizing said cylinder thereby causing axial outboard displacement of said piston relative to said first caliper and activation of said brake, said adjusting mechanism comprising:

adjustment screw means coaxial with said piston, said adjustment screw means axially moveable relative to said first caliper leg and including one end coupled to said first caliper leg and exposed to hydraulic pressure in said cylinder, and including an opposite threaded end extending from said cylinder into an axially extending cavity formed in the inboard end of said piston and having an outboard facing end surface exposed to atmospheric pressure through a passageway formed in said piston thereby subjecting said adjustment screw means to a resultant axial outboard hydraulic force proportional to the hydraulic pressure in said cylinder;

nut means coaxial with and threadingly engaging said opposite threaded end of said adjustment screw means, said nut means axially moveable along said adjustment screw means to vary the unactivated position of said piston relative to said first caliper leg, thereby adjusting the brake;

compression spring means for exerting a predetermined axial outboard force on said nut means relative to said piston;

friction means interposed between said nut means and siad piston means, said friction means operable in a first condition wherein the frictional engagement between said nut means and said piston is such that the axial force exerted on said nut means by said spring means is sufficient to cause rotation of said nut means to axial advance said nut means along said adjustment screw means to adjust the brake, and a second condition wherein there is sufficient frictional engagement between said nut means and said piston such that the axial force exerted on said nut means by said spring means does not rotate and axial advance said nut and does not adjust the brake; and said adjustment screw means responsive to hydraulic pressure within said cylinder less than or equal to a predetermined amount for operating said friction means in said first condition after initial hydraulic activation and outboard displacement of said piston, and responsive to hydraulic pressure within said cylinder is greater than said predetermined amount for operating said friction means in said second condition.

3. The automatic mechanism according to claim 2 wherein said compression spring means is a first spring means, and including a second spring means for exerting an axial inboard second spring force on said adjusting screw means relative to said first caliper leg, said second spring force on said adjusting screw means being greater than the opposing resultant hydraulic force on said adjustment screw means when the hydraulic pressure in said cylinder is less than or equal to said predetermined amount to urge said adjustment screw means in an inboard direction to maintain said friction means in said first condition and permit adjustment of the brake, and wherein the opposing resultant hydraulic force on said adjustment screw means is greater than said second spring force when the hydraulic pressure in said cylinder is greater than said predetermined amount to urge said adjustment screw means in an outboard direction to maintain said friction means in said second condition and prevent adjustment of the brake.

4. The automatic adjusting mechanism according to claim 2 wherein the outboard end of said adjustment screw means slidably and sealingly engages an outboard end portion of said cavity.

5. The automatic adjusting mechanism according to claim 2 including bearing means between said spring means and said nut means for enabling free rotation of said nut means relative to said piston.

6. The automatic adjusting mechanism according to claim 2 wherein said one end of said adjustment screw means is coupled to said first caliper legs by a mechanically actuated cam means for mechanically urging said adjustment screw means, said nut means, and said piston in an outboard axial direction to mechanically actuate the brake.

7. The automatic adjusting mechanism according to claim 6 wherein said cam means is a rotary ball cam actuating mechanism including a first cam plate secured to the inboard end of said adjustment screw means and an opposite second cam plate axially fixed relative to said first caliper leg, each cam plate haivng a multiplicity of oppositely corresponding ball ramp surfaces, a corresponding number of balls positioned between and received within said ball ramp surfaces whereby rotation of said first cam plate causes said balls to roll along said ball ramp surfaces thereby effecting axial separation of said cam plates by an amount proportional to the annular rotation of said first cam plate, race means positioned between said first and second cam plates affixing the annular orientation of said balls one to the other, said race means including crank means communicating with said first and second cam plates whereby rotation of said first cam plate relative to said second cam plate causes said crank means to correspondingly position said race means such that said balls track along said ball ramps on a predetermined path.

8. The automatic adjusting mechanism according to claim 7 including means for preventing rotation of said first cam plate relative to said first caliper leg, and means for rotatably supporting said second cam plate relative to said first caliper leg.

9. The automatic adjusting mechanism according to claim 8 including a shaft portion secured to the inboard side of said second cam plate and extending through and rotatably supported within a bore formed in the inboard end of said first caliper leg, and seal means surrounding and sealingly engaging said bore, both of said first and second cam plates located within said cylinder and being exposed to any hydraulic pressure therein.

10. The automatic adjusting mechanism according to claim 8 wherein said means for preventing rotation of said first cam plate includes an axially extending slot formed in the outer periphery of said first cam plate, and a removable pin having an outer portion secured relative to said first caliper leg and an inner portion which extends inwardly into said slot.

* * * * *